United States Patent
Bozovic et al.

(10) Patent No.: US 11,718,886 B2
(45) Date of Patent: Aug. 8, 2023

(54) METHOD FOR PRODUCING A BRAKE ELEMENT, BRAKE ELEMENT

(71) Applicant: Robert Bosch GmbH, Stuttgart (DE)

(72) Inventors: Ilija Bozovic, Malsch (DE);
Karl-Heinz Linek, Remseck (DE);
Karl-Otto Englert, Gundelsheim (DE);
Laurent Le Barzic, Karlsruhe (DE);
Roland Raab, Wiesloch (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 17/181,717

(22) Filed: Feb. 22, 2021

(65) Prior Publication Data

US 2022/0267873 A1    Aug. 25, 2022

(51) Int. Cl.
| *C22C 27/04* | (2006.01) |
| *F16D 65/12* | (2006.01) |
| *C21D 9/00* | (2006.01) |
| *C21D 5/00* | (2006.01) |
| *C22C 37/00* | (2006.01) |

(52) U.S. Cl.
CPC .......... *C21D 9/0068* (2013.01); *C21D 5/00* (2013.01); *C22C 37/00* (2013.01); *F16D 65/125* (2013.01); *F16D 65/127* (2013.01); *F16D 2200/0013* (2013.01)

(58) Field of Classification Search
CPC ......... C22C 37/04; C22C 37/06; C22C 37/08; C22C 37/10; C22C 37/00; F16D 65/12; F16D 65/125; F16D 65/127; F16D 2200/0013; C21D 9/0068; C21D 5/00
USPC .......... 188/18 A, 218 A, 218 R, 218 XL; 29/428; 148/547, 548, 612–617
See application file for complete search history.

(56) References Cited

U.S. PATENT DOCUMENTS

| 5,603,784 A | 2/1997 | Bay | |
| 6,352,141 B1* | 3/2002 | Wendt | F16D 65/12 148/612 |
| 2004/0112479 A1* | 6/2004 | Druschitz | C22C 37/10 148/617 |
| 2017/0233841 A1* | 8/2017 | Larker | C21D 5/00 420/108 |
| 2020/0217382 A1* | 7/2020 | Kuckert | F16D 65/127 |

FOREIGN PATENT DOCUMENTS

| DE | 197 53 116 C1 | 7/1999 | | |
| JP | H02-138527 A | 5/1990 | | |
| KR | 20070064725 A * | 6/2007 | | C22C 37/08 |
| WO | WO-2018059748 A1 * | 4/2018 | | F16D 65/123 |

* cited by examiner

*Primary Examiner* — Christopher P Schwartz
(74) *Attorney, Agent, or Firm* — Maginot, Moore & Beck LLP

(57) ABSTRACT

A method is disclosed for producing a brake element, in particular a brake disk or brake drum, which has a friction portion and a fastening portion, wherein a blank for at least the friction portion is produced by a casting method from gray cast iron with lamellar graphite, wherein the blank is subjected to austenitizing at a predefined austenitizing temperature, and wherein the austenitized blank is subjected to austempering at a predefined austempering temperature. The friction portion and the fastening portion is produced in one piece, and that the fastening portion is produced with a wall thickness of at least 1.5 and at most 4.5 mm.

17 Claims, 1 Drawing Sheet

METHOD FOR PRODUCING A BRAKE ELEMENT, BRAKE ELEMENT

This application incorporates herein by reference in its entirety the following: patent application no. DE 10 2020 201 305.5, filed on Feb. 4, 2020 in Germany.

The disclosure relates to a method for producing a brake element, in particular a brake disk or brake drum, which has a friction portion and a fastening portion, wherein a blank for at least the friction portion is produced by a casting method from gray cast iron with lamellar graphite, wherein the blank is subjected to austenitizing at a predefined austenitizing temperature, and wherein the austenitized blank is subjected to austempering at a predefined austempering temperature.

The disclosure moreover relates to a brake element produced according to a method of the type mentioned at the outset.

BACKGROUND

Methods of the type mentioned at the outset are known. For example, patent document DE 197 53 116 C1 discloses a brake disk having a friction portion from bainite. In order for the brake disk to be produced, a blank for the friction portion of the brake disk is produced in a casting method from gray cast iron with lamellar graphite. This blank is subjected to a multi-stage heat treatment, wherein the blank is first subjected to austenitizing at a predefined austenitizing temperature, and wherein the austenitized blank is subsequently subjected to austempering at a predefined austempering temperature so as to obtain the austempered friction portion, thus the friction portion from bainite.

Before or after the friction portion having been subjected to austempering, a fastening portion of the previously known brake disk is cast onto the blank, or the austempered friction portion, respectively. A material different from that of the friction portion is used for the fastening portion.

SUMMARY

The method according to the disclosure having the features described herein is distinguished in that a one-piece blank is produced as the blank for the friction portion and the fastening portion such that a one-piece brake element of bainite is obtained by the austempering. The friction portion as well as the fastening portion of the brake element produced by the method according to the disclosure thus comprise bainite. Austenitizing the blank is to be understood as converting the material of the blank to austenite. Austempering is to be understood as converting the austenite of the austenitized blank to bainite. The friction portion of the brake element is to be understood to be that part of the brake element against which brake members are pressed for generating a frictional brake torque according to the intended use of the brake element in a friction brake installation. If the brake element is a brake disk, the friction portion is configured as a friction ring. However, if the brake element is a brake drum, the friction portion is a friction drum. The fastening portion is to be understood to be that part of the brake element by way of which the brake element is able to be fastened according to the intended use on a vehicle, for example on a wheel hub of the vehicle. The fastening portion is in particular a brake cover of the brake element. Because the fastening portion in this instance is also produced from bainite, the fastening portion has a high tensile strength. According to the disclosure, the blank is produced in such a manner that the fastening portion has a wall thickness of 1.5 mm to 4.5 mm. Despite the minor wall thickness, a desired stability is guaranteed on account of the advantageous austempering. When the brake element is installed in a friction brake installation of a vehicle, any unsprung mass of the vehicle is reduced in comparison to conventional brake elements on account of the brake element, in particular on account of the indicated wall thickness in the friction portion. Moreover, the brake element produced according to the method according to the disclosure has a high degree of inherent damping. It is therefore unlikely for screeching to arise in the brakes in a friction brake installation comprising the brake element.

The fastening portion particularly preferably has a wall thickness between 2 mm and 4 mm. The friction portion has in particular a wall thickness of 2.5 mm. According to one preferred embodiment of the disclosure, the fastening portion continuously has a constant or at least substantially constant wall thickness. It is achieved on account of the advantageous embodiments that weight is saved and a sufficient strength of the brake element is nevertheless guaranteed.

According to one preferred embodiment it is provided that the blank is austenitized for a duration of 30 minutes to 120 minutes. The duration is thus at least 30 minutes and at most 120 minutes. At least substantially complete austenitizing of the blank is caused on account of the duration of the austenitizing being chosen in such a manner, so that substantially complete austempering of the austenitized blank can thereafter take place. The blank is preferably austenitized for a duration of 45 minutes to 90 minutes; particularly preferably for a duration of approximately 60 minutes.

According to one preferred embodiment it is provided that a temperature between 790° C. and 915° C. is predefined as the austenitizing temperature. The austenitizing of the blank is achieved in a reliable and at least substantially complete manner on account of the austenitizing temperature being chosen in such a manner. A temperature of approximately 850° C. is particularly preferably predefined as the austenitizing temperature. The temperature during the austenitizing is preferably maintained so as to be at least substantially constant.

The austenitized blank is preferably subjected to austempering for a duration of 2 hours to 5 hours, preferably 3 hours to 4 hours. The austempering of the austenitized blank is achieved in a reliable and at least substantially complete manner with an austempering duration of this type. The brake element in this instance has the aforementioned advantages in terms of the tensile strength and the inherent damping.

According to one preferred embodiment it is provided that a temperature between 260° C. and 350° C. is predefined as the austempering temperature. On account of the austempering temperature being chosen in such a manner, it is guaranteed that the austempering takes place, on the one hand. On the other hand, it is avoided that the austenite is converted to materials other than bainite. The conversion of the austenite to bainite thus takes place selectively. A temperature of approximately 260° C. is particularly preferably predefined as the austempering temperature. The temperature during the austempering is preferably maintained so as to be at least substantially constant.

Following austenitizing, the austenitized blank is preferably quenched. Quenching herein is to be understood to be a cooling procedure at a high cooling rate. On account of the austenitized blank being quenched, it is avoided that pearlite is formed during the cooling procedure. Liquid salt, water or oil is preferably used as a coolant when quenching.

According to one preferred embodiment it is provided that the cooling rate of the austenitized blank when quenching is 30° C. per minute to 50° C. per minute. On account thereof, it is reliably avoided that pearlite is formed, on the one hand. On account of the quenching at a cooling rate of this type it is avoided that fissures are formed in the austenitized blank during the quenching, on the other hand.

According to one preferred embodiment it is provided that a wear-protection layer is applied at least to a friction face of the friction portion. Wear on the brake element is reduced and a maximum service life of the brake element is increased on account thereof. The entire surface of the brake element is preferably provided with the wear-protection layer. The wear-protection layer is preferably a ceramic layer or a boride layer.

According to an alternative embodiment it is preferably provided that the friction face, in particular all friction faces of the friction portion, are configured so as to be free of a wear-protection layer. On account of the advantageous austempering of the blank, the friction portion is already advantageously hardened in such a manner that an additional wear-protection layer which would have to be applied in a further method step can be dispensed with and is preferably dispensed with. The method is simplified and production costs are reduced on account thereof.

The brake element according to the disclosure, in particular the brake disk or brake drum, having the features described herein is distinguished in that the brake element is produced by means of the method according to the disclosure. The advantages already mentioned are also derived therefrom. Further preferred features and combinations of features are derived from the description above as well as from the claims.

The brake element is preferably at least substantially free of pearlite. The brake element has a particularly advantageous tensile strength and inherent damping on account thereof.

BRIEF DESCRIPTION OF THE DRAWINGS

The disclosure will be explained in more detail hereunder by way of the drawings in which.

DETAILED DESCRIPTION

Figure 1:
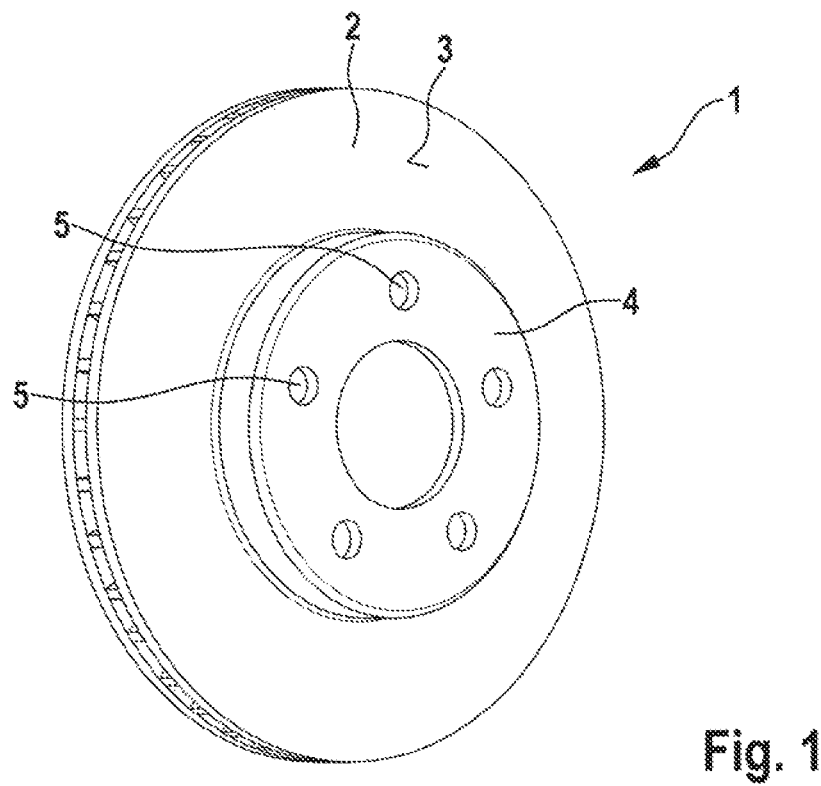
FIG. 1 shows a brake element in a perspective illustration.

FIG. 1 in a perspective illustration shows a brake element 1 which is configured as a brake disk 1. The brake element 1 has a friction portion 2 which is configured so as to be annular such that the friction portion 2 is a friction ring 2. The friction ring 2 has a friction face 3 and a further friction face which is opposite the friction face 3 so that the further friction face cannot be seen in FIG. 1. When the brake disk 1 is used according to the intended use in a brake system, brake members of the brake system are pressed against the friction faces of the brake disk 1 in order to generate a frictional brake torque.

The brake disk 1 moreover has a fastening portion 4. The fastening portion 4 is that part of the brake disk 1 by way of which the brake disk 1 can be fastened to a wheel hub of a vehicle. The fastening portion 4 here is configured as a brake cover 4. The brake cover 4 has a plurality of axial holes 5 for fastening means to pass through in order for the brake disk 1 to be fastened to the wheel hub by means of the brake cover 4.

The friction portion 2 and the fastening portion 4 are configured so as to be formed in one piece. The friction portion 2 as well as the fastening portion 4 are produced from bainite. By virtue of being produced from bainite, the brake disk 1 has a high tensile strength as well as a high degree of inherent damping. By virtue of the high tensile strength, the brake disk 1 can be produced with a minor wall thickness. The friction portion 2 as well as the fastening portion 4 here have a wall thickness of presently 2 to 4 mm.

Figure 2:
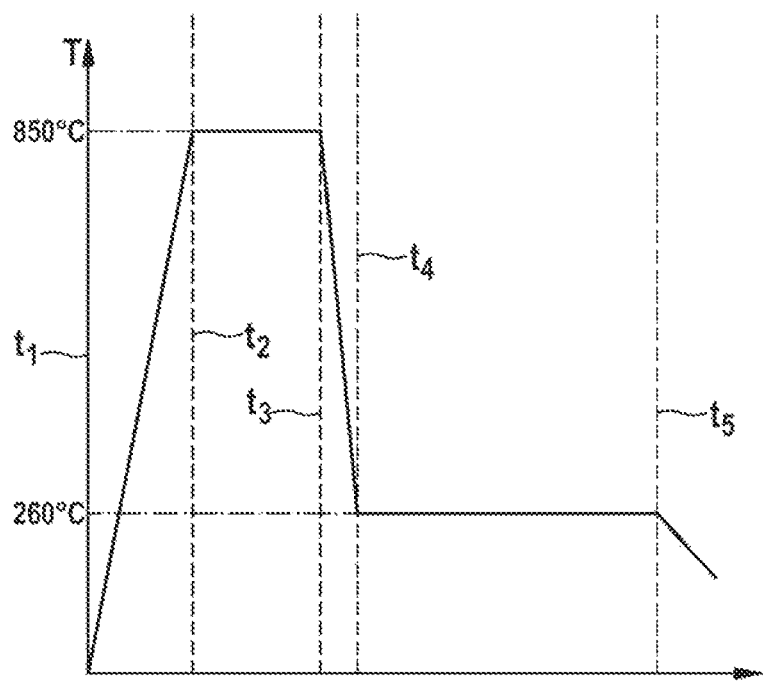
FIG. 2 shows a method for producing the brake element.

A method for producing the brake disk 1 will be explained in more detail hereunder with reference to FIG. 2. To this end, FIG. 2 shows a diagram wherein the time t is illustrated on an abscissa of the diagram, and the temperature T is illustrated on an ordinate of the diagram.

A blank for the brake disk 1 is produced prior to a first temporal point t1. A one-piece blank is thus produced for the friction portion 2 and the fastening portion 4. The blank herein is produced or cast, respectively, by a casting method from gray cast iron with lamellar graphite.

Between the first temporal point t1 and a second temporal point t2, the blank is heated from room temperature to an austenitizing temperature of 850° C. A furnace or an inductive heating installation is used for heating the blank, for example.

Austenitizing of the blank commences as the austenitizing temperature is reached, thus at the second temporal point t2. The material of the blank is thus converted to austenite. During the austenitizing, the temperature of the blank is constantly maintained at the austenitizing temperature. The blank presently is austenitized for a duration of 60 minutes. Particularly advantageous austenitizing of the blank is achieved when the duration is between 30 minutes and 120 minutes.

The duration for the austenitizing ends at a third temporal point t3. The blank which now is austenitized is quenched following the third temporal point t3. To this end, the austenitized blank is cooled at a cooling rate of approximately 40° C. per minute. Liquid salt, water or oil is used as a coolant herein, for example. It is avoided that pearlite is formed on account of the austenitized blank being quenched.

At a fourth temporal point t4, the austenitized blank has a temperature of 260° C. This temperature hereunder is referred to as the austempering temperature. The austenitized blank is in particular quenched in a salt bath and subsequently impinged with the austempering temperature for a duration of approximately 4 hours. The austenitized blank is austempered on account of being stored at the austempering temperature. The austenite of the austenitized blank is thus converted to bainite such that the blank subsequent to being stored at the austempering temperature for the duration of approximately 4 hours is at least substantially composed of bainite.

The duration of 4 hours ends at a fifth temporal point t5. The blank which now is austempered is cooled to room temperature following the fifth temporal point t5.

In order for the brake disk 1 illustrated in FIG. 1 to be produced, the austempered blank is ground and balanced. Subsequently to being ground and balanced, the brake disk 1 is optionally provided with a wear-protection layer. The wear-protection layer is preferably applied at least to the friction faces. According to a further exemplary embodiment, the wear-protection layer is alternatively dispensed with such that the brake disk, in particular the friction faces of the brake disk, is/are configured so as to be free of a wear-protection layer. The advantageous production of the brake disk described above already guarantees sufficient protection against wear for most applications.

What is claimed is:

1. A method for producing a brake element which has a friction portion and a fastening portion, comprising:
   producing a blank with the friction portion and the fastening portion configured as one piece, with the fastening portion having a wall thickness of at least 1.5 mm and at most 4.5 mm, by a casting method from gray cast iron with lamellar graphite;
   subjecting the blank to an austenitizing process at a predefined austenitizing temperature so as to produce an austenitized blank;
   quenching the austenitized blank at a cooling rate of between 30° C. per minute and 50° C. per minute; and
   subjecting the quenched austenitized blank to an austempering process at a predefined austempering temperature so as to produce the brake element.

2. The method according to claim 1, wherein producing the blank further includes producing the fastening portion with a wall thickness of at least 2 mm and at most 4 mm.

3. The method according to claim 2, wherein producing the blank further includes producing the fastening portion with a wall thickness of at least 2.5 mm.

4. The method according to claim 1, wherein the austempering process has a duration of 2 hours to 5 hours.

5. The method according to claim 4, wherein the austempering process has a duration of between 3 to 4 hours.

6. The method according to claim 1, wherein the austenitizing process has a duration of between 30 minutes to 120 minutes.

7. The method according to claim 1, wherein the first predefined austenitizing temperature is between 790° C. and 915° C.

8. The method according to claim 1, wherein the predefined austempering temperature is between 260° C. and 350° C.

9. The method according to claim 1, wherein after the austempering process the following step is performed:
   applying a wear-protection layer to at least a friction face of the friction portion.

10. The method according to claim 1, wherein after the austempering process the following step is performed:
    abstaining from applying a wear-protection layer to at least a friction face of the friction portion so that the brake element is free of a wear-protection layer.

11. A brake element which is produced by the method set forth in claim 1, wherein the brake element is at least substantially free of pearlite after the austempering process.

12. The method according to claim 1, wherein the brake element is a brake disk or brake drum.

13. A method for producing a brake disk or brake drum which has a friction portion and a fastening portion, comprising:
    producing a blank with the friction portion and the fastening portion configured as one piece, with the fastening portion having a wall thickness of at least 1.5 mm and at most 4.5 mm, by a casting method from gray cast iron with lamellar graphite;
    subjecting the blank to an austenitizing process at a predefined austenitizing temperature so as to produce an austenitized blank;
    quenching the austenitized blank at a cooling rate of between 30° C. per minute and 50° C. per minute so that formation of pearlite is essentially avoided; and
    subjecting the austenitized blank to an austempering process at a predefined austempering temperature so as to produce the brake disk or brake drum.

14. The method according to claim 13, wherein:
    the austenitizing process has a duration of between 30 minutes to 120 minutes, and
    the austempering process has a duration of 2 hours to 5 hours.

15. The method according to claim 14, wherein:
    the predefined austenitizing temperature is between 790° C. and 915° C., and
    the predefined austempering temperature is between 260° C. and 350° C.

16. The method according to claim 13, wherein after the austempering process the following step is performed:
    applying a wear-protection layer to at least a friction face of the friction portion.

17. The method according to claim 13, wherein after the austempering process the following step is performed:
    abstaining from applying a wear-protection layer to at least a friction face of the friction portion so that the brake element is free of a wear-protection layer.

* * * * *

UNITED STATES PATENT AND TRADEMARK OFFICE
CERTIFICATE OF CORRECTION

PATENT NO. : 11,718,886 B2
APPLICATION NO. : 17/181717
DATED : August 8, 2023
INVENTOR(S) : Bozovic et al.

It is certified that error appears in the above-identified patent and that said Letters Patent is hereby corrected as shown below:

In the Claims

In Claim 7, at Column 5, Lines 34-35: "the first predefined austenitizing temperature" should read --the predefined austenitizing temperature--.

Signed and Sealed this
Twenty-first Day of November, 2023

Katherine Kelly Vidal
Director of the United States Patent and Trademark Office